United States Patent [19]

Glemser et al.

[11] Patent Number: 4,696,875
[45] Date of Patent: Sep. 29, 1987

[54] POSITIVE ELECTRODE FOR ALKALINE STORAGE CELLS

[75] Inventors: Oskar Glemser; Dieter H. Buss, both of Gottingen; Jürgen Bauer, Hildesheim, all of Fed. Rep. of Germany

[73] Assignee: Varta Batterie Aktiengesellschaft, Hanover, Fed. Rep. of Germany

[21] Appl. No.: 870,759

[22] Filed: Jun. 4, 1986

[30] Foreign Application Priority Data

Jun. 5, 1985 [DE] Fed. Rep. of Germany ....... 3520108

[51] Int. Cl.$^4$ ........................................... H01M 10/24
[52] U.S. Cl. .................................. 429/206; 429/218; 429/221; 429/222; 429/223; 429/231; 252/182.1
[58] Field of Search ............... 429/206, 218, 223, 221, 429/231, 222, 229; 252/182.1

[56] References Cited

U.S. PATENT DOCUMENTS 4,224,392  9/1980  Oswin ................................. 429/206
4,603,094  7/1986  Yasuda ............................ 429/218 X

OTHER PUBLICATIONS

W. Böhnstedt, D. H. Buss, E. Häusler, O. Glemser, Electrochimica Acta 19 (1974), 941–945.

Primary Examiner—Anthony Skapars
Attorney, Agent, or Firm—Marmorek, Guttman & Rubenstein

[57] ABSTRACT

A positive electrode for alkaline storage cells is disclosed. The active material for the positive electrode is a double hydroxide of the formula

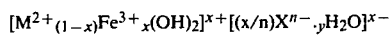

$$[M^{2+}_{(1-x)}Fe^{3+}_x(OH)_2]^{x+}[(x/n)X^{n-}\cdot yH_2O]^{x-}$$

wherein x is in the range $0.05 \leq x \leq 0.4$, $M^{2+}$ is an oxidizable and reducible, and $X^{n-}$ is at least one anion. The double hydroxide has a pyroaurite-like double layer structure and is electrochemically resistant to iron poisoning. In a preferred embodiment, the double hydroxide comprises $[Ni_4Fe(OH)_{10}]^{30} [NO_3^-\cdot yH_2O]^{31}$. Methods for preparing positive electrodes having the double hydroxide active material are also disclosed.

16 Claims, No Drawings

POSITIVE ELECTRODE FOR ALKALINE STORAGE CELLS

FIELD OF THE INVENTION

This invention relates to a positive electrode for secondary cells having alkaline electrolytes. In particular, this invention relates to a new active material for the positive electrode of an alkaline storage cell.

BACKGROUND OF THE INVENTION

In general, the active material in the positive plates of an alkaline storage battery is nickel hydroxide. The active material in the negative plates of such an alkaline storage battery is usually cadmium or iron in the charged state. Regardless of the active material in the negative electrodes, alkaline storage cells are frequently referred to as steel accumulators. This reflects the fact that iron is used as a constructional material in the storage cell. Thus, not only are the negative plates made from iron, but also the positive nickel electrodes are constructed using a perforated nickelplated steel strip as the support for the active material. The nickel-plated steel strip adds mechanical sturdiness to the nickel electrodes and also acts as a mass carrier.

Tubular electrodes, first developed by Edison, and which have hardly changed since then, also employ a steel strip or ribbon. The steel strip in such tubular electrodes is wound spirally on the mandrel of a drawing machine. These tubular electrodes are folded at their ends and contain within them alternating layers of nickel(II) hydroxide and nickel flakes as the conducting material.

Positive sinter electrodes also employ a very thin, perforated steel strip. On both sides of this steel strip, nickel powder is pasted on and sintered in a continuous process. Incidentally, negative cadmium sinter electrodes are constructed in a similar manner.

One of the problems with prior art alkaline storage batteries arises from the deleterious effects of iron impurities. If one disregards the contribution from the iron/iron hydroxide negative electrode of an Edison storage battery, the main source of iron impurities in alkaline storage batteries is the steel strip. These iron impurities have a harmful effect on the operation of the positive nickel electrodes. Iron dumping arises in the areas of the steel strip surface where there are pores, or in areas of the steel strip which are damaged. Iron dumping can reach a substantial extent, especially in the case of electrodes having fiber metal frameworks which are becoming increasingly popular.

S. U. Falk and A. J. Salkind, in *Alkaline Storage Batteries*, John Wiley & Sons, Inc., New York, London, Sidney, Toronto (1969), at pages 630–631, suggest that the harmful iron impurity in an Edison-type storage battery arises from iron that is dissolved by anodic oxidation in KOH to form primarily ferrate ions The ferrate ions are not stable but decompose spontaneously into iron(III) hydroxide and oxygen.

The harmful effect of the iron is seen in a decrease of the charging efficiency of the nickel electrode. This detrimental effect is believed to result from a reduction of the oxidation state of the nickel hydroxide to a state which does not correspond to a full charge which is caused by the fact that the iron hydroxide reduces the oxygen overvoltage at the surface of the electrode.

In reality, the harmful effect of iron can be attributed to colloidally dissolved iron aquoxide particles, which can be demonstrated to be present in such electrolytes by analytical means and by the Tyndall effect. Such particles are drawn into an inhomogeneous magnetic field (of the kind surrounding any electrode passing current), because of a negative surface charge on such particles, and also, as W. Bohnstedt et al., at 19 *Electrochem. Acta*, 941 (1974), have shown, because of the super-paramagnetic behavior of such particles. During the charging process, the iron aquoxide particles concentrate near the anode and an electro-phoretic dissolution occurs at the surface of the nickel hydroxide.

In accordance with these findings, Mlynarek et al., at 14 *J. Appl. Electrochem*, 145 (1984), have suggested that the potential range which is achieved during charging of the nickel hydroxide electrode is sufficient to form magnetite ($Fe_3O_4$). They view this magnetite formation to be the cause of the evolution of oxygen, which they proved to occur by volumetric methods, during charging of the nickel hydroxide electrode in the presence of iron impurities. As is well known, magnetite is a good current conductor and exhibits a small oxygen overvoltage.

Heretofore, the nickel electrode could only be protected from the harmful effects of colloidal iron aquoxide particles by employing dense membrane separators. However, the use of such membrane separators is unsatisfactory because of their high production costs. In addition, because of their relatively high resistance, the membrane separators substantially limit the maximum charge and discharge current densities which can be achieved.

SUMMARY OF THE INVENTION AND DETAILED DESCRIPTION OF PREFERRED EMBODIMENTS

It is therefore the principal object of this invention to provide a positive electrode for an alkaline storage battery that can be used in conjunction with all negative electrodes of an alkaline system, particularly with iron or zinc negative electrodes, and which is insensitive in its electrochemical operation to iron impurities.

This object is achieved in accordance with the present invention by providing a positive electrode in which the active material, in the uncharged state, is a double hydroxide having the general formula

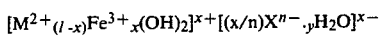

wherein the parameter x can have values between 0.05 and 0.4, wherein $M^{2+}$ is an oxidizable and reducible cation, and wherein $X^{n-}$ is at least one arbitrary anion provided for charge compensation of the complex double hydroxide cation.

An especially preferred composition in accordance with the above chemical formula is obtained when $x=0.2$ and $M^{2+}$ is $Ni^{2+}$ or $Co^{2+}$. The anion $X^{n-}$ of this especially preferred composition should be $NO_3^-$, $SO_4^{2-}$, or $CO_3^{2-}$.

If one chooses $x=0.2$, and one normalizes the above-mentioned chemical formula to a single atom of Fe, and one further assumes that the double hydroxide was precipitated from a nitrate solution containing $Ni^{2+}$ and $Fe^{3+}$ ions, then a double hydroxide is obtained having the specific chemical formula

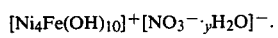

The double layer structure of the mineral pyroaurite can be assigned to the double hydroxide of the present invention. For the mineral pyroaurite, $M^{2+}$ would be $Mg^{2+}$ (instead of $Ni^{2+}$ or $Co^{2+}$), and $1/n\ X^{n-}$ would be $\frac{1}{2}\ CO_3^{2-}$ (instead of $NO_3^-$).

The pyroaurite structure is described by R. Allmann in 24 Chimia, 99–108 (1970) as being derived from the brucite-like grid of $\beta$-Ni(OH)$_2$. In pyroaurite, $M^{2+}$ and $M^{3+}$ ions are inserted into the grid in place of the nickel in the M(OH)$_2$ layers (M=Ni) in a random distribution with $M^{2+}$ and $M^{3+}$ being almost equal. The charge surplus that is introduced by the triply valent cations in the main M(OH)$_2$ layers is balanced by the anions $X^-$. The hydroxyl ions present in the main layers, originally having a full charge of $-1$, favor this new charge balance because, as a result of the introduction of the $M^{2+}$ and $M^{3+}$ ions, the hydroxyl ions experience a decrease in their bonding strength to a charge $<1$. This enables them to compensate charges $>1$, in the course of which the H-atom of a M-OH bond is partially bonded by another strongly negative atom X. This results in the creation of hydrogen bonds O-H . . . X. In this manner, the $X^-$ ions are, together with the $H_2O$ molecules, interleaved between the brucite-like main layers to form a succession of layers comprising $[M^{2+}_{(1-x)}M^{3+}_x(OH)_2]^{x+}$ layer cations, and $[(x/n)X^{n-}.yh_2O]^{x-}$ interlayer anions (thus a "double-layer structure").

In a Ni, Fe double hydroxide composition of the present invention, the distance between successive main layers is approximately 790 pm (7.9 Å). As will be described further below, the $M^{2+}$, $Fe^{3+}$ double hydroxide material of the present invention acts as the active material in a secondary electrode and is electrochemically resistant to iron impurities. This surprising quality makes it especially useful in Ni/Fe storage batteries and is therefore referred to as a "siderophile" or "iron-loving" electrode.

A Ni, Fe double hydroxide composition in accordance with the present invention can be prepared by the simultaneous precipitation of $Ni^{2+}$ and $Fe^{3+}$ ions from an acidified salt solution by introducing a caustic potash solution having a pH value of 12.5 at a temperature between 304° K. and 306° K. Depending on the desired composition of the precipitation product (e.g., $0.05 \leq X \leq 0.4$), a starting acid solution containing Ni(NO$_3$)$_2 \times$ 6H$_2$O and Fe(NO$_3$)$\times$9H$_2$O is used wherein the salts are present in molar ratios ranging between 19:1 and 1.5:1. Accordingly, a double hydroxide of the present invention is obtained having a Ni/Fe atom ratio of between 95/5 and 60/40.

In order to carry out the precipitation reaction, a glass bulb having several necks is thermostabilized at a temperature of 305° K. Into this glass bulb, an aqueous KOH solution at the predetermined pH value is introduced. Simultaneously with the introduction of the metal salt solution to the glass bulb, a carbonate-free 1 to 3 molar KOH solution is sprayed into the glass bulb by means of diaphragm pumps while stirring. Deviations from the predetermined pH value are automatically corrected by adding diluted caustic potash or 1M nitric acid to maintain the pH value within a tolerance of $+/-0.1$ pH units.

Alternatively, the precipitation reaction for preparing the double hydroxide composition of the present invention can be carried out at the pH value of the isoelectric point of the hydroxide for the particular $M^{2+}$ ion. In this case as well, a thermostat is used to maintain the reaction temperature of 304° K. to 305° K. within a tolerance of $+/-1°$ K.

The double hydroxide composition of the present invention can be incorporated as the active positive material in porous sinter fiber electrodes. In accordance with known methods for producing sinter fiber electrodes, the sinter framework should be soaked once or several times with the acidified metal salt solution containing the $Ni^{2+}$ or $Co^{2+}$ and $Fe^{3+}$ ions, after which it is dipped into the alkali solution.

It is also within the contemplation of this invention to produce the present composition by preparing a smelt of both metal salts, and then by alkalizing after solidification to precipitate the double hydroxide.

The precipitation reaction can be carried out in sinter electrodes by electrolytic techniques after the electrodes are impregnated with the aqueous metal salt solution. In such an electrolytic refining process, the porous sinter body comprises the cathode. Hydrogen ions are used up in this process and the cations located in the pores are precipitated in the form of the double hydroxide.

EXAMPLES

Various experimental examples of the double hydroxide chemical compounds in accordance with the present invention were prepared. These samples had the following Ni/Fe atom ratios: 95/5, 85/15, 80/20, and 70/30 in the precipitation product. A high alkali, single rod measuring chain (type HA/KO5-NS, Ingold), was used to monitor and control the precipitation reaction. The respective liquid volumes to be mixed were determined with the aid of a calculator (type AIM-65, Rockwell) and their influx rate was adjusted to the desired pH value by a diaphragm pump. During the preparations, the total metal ions concentration in the salt solution was maintained at 0.5 mol/l.

After the precipitation reaction was completed, the suspension was stirred for another eight to ten hours. Thereafter, the reaction product was passed directly through a tube conduit into a glove-box that had been rinsed with nitrogen. The suspension was then filled into sealable centrifugal cups made from polypropylene and was centrifuged outside the box for ten minutes in a laboratory centrifuge at 3,000 rpm. Thereafter, the samples were washed four times with a KOH solution at the pH value of the precipitation reaction or with double distilled water. The product was then placed in a desiccator in the glove box and dried for three days at room temperature at 10 mbar. The samples were stored under a nitrogen atmosphere until used. The samples were chemically analyzed and the following table of values was produced in comparison with $\beta$-Ni(OH)$_2$:

TABLE I

|  | Ni(OH)$_2$ | Ni/Fe 95/5 | Ni/Fe 90/10 | Ni/Fe 80/20 |
|---|---|---|---|---|
| Wt. % Ni | 60 | 56.8 | 50.9 | 44.9 |
| Wt. % Fe |  | 3.1 | 5.5 | 10.9 |
| Wt. % N |  | 0.3 | 1.3 | 2.45 |
| Wt. % Ni(OH)$_2$ | 94.8 | 89.7 | 80.4 | 70.9 |
| Mol. ratio |  |  |  |  |
| Ni:Fe |  | 17.4:1 | 8.8:1 | 3.9:1 |
| Fe:NO$_3$ |  | 1:0.39 | 1:0.94 | 1:0.90 |

In the sample having a Ni/Fe ratio of 80/20, the analysis values correspond to the formula Ni$_4$Fe(OH)$_{1.0}$NO$_3$ with an insignificant water content disregarded.

In addition to chemical analysis, the double hydroxide samples prepared were analyzed by X-ray diffraction. Diffraction patterns taken of powered samples of the double hydroxide in accordance with the method of Debye-Scherrer (Cu-K$_\alpha$-radiation) exhibit wider lines than those of $\beta$-Ni(OH)$_2$, which suggests disrupted structures. However, the wider lines can also result from the double layer pyroaurite structure. While the characteristic brucite reflections disappear with increasing Fe content in the double hydroxide, new reflections appear which emanate from a substantially larger cell unit. For example, a sample of the double hydroxide having a Ni/Fe ratio of 80/20 provided net surface distances of d = 789 pm, d = 2370 pm (003), d=394 pm (006), d=274 pm (10$\bar{1}$2), d=232 pm (10$\bar{1}$5), with certain reservations due to the line width. At higher Fe content, for example when the Ni/Fe content is 70/30, the samples prove to be X-ray amorphous.

Electrochemical measurements were taken during cycles of charging and discharging to demonstrate the resistance to iron poisoning of the Ni/Fe double hydroxide of the present invention. Sample tubes of about 10 cm length and 1 cm diameter served as the experimental electrodes. Into these tubes, a mixture comprising 2.9 g of the sample substance and 7.0 g nickel power as conducting material was introduced with a nickel bar. These experimental electrodes were placed in the center of a plexiglas cylinder that was covered on its inner surface with oversized negative counter-electrodes. The counter-electrodes that were used were either already substantially corroded Fe/Fe(OH)$_2$ electrodes (to force iron poisoning), or Cd/Cd(OH)$_2$ electrodes of the sinter fiber type.

A 30% KOH solution served as the electrolyte. The current conditions throughout were as follows: Charge for 600 or 700 minutes at 100 mA, discharge at 100 mA until reaching a cell voltage of 1V up to a potential of 0.1 as measured against Hg/HgO.

The capacities which were measured from the fifth to the thirtieth cycle of a sample having a Ni/Fe ratio of 80/20 are shown in Table II. The capacities measured for a Ni(OH)$_2$ electrode (content of the sample tube is 2.9 g Ni(OH$_2$) and 7.0 g nickel power) are also shown.

TABLE II

| | Ni$_4$Fe(OH)$_{10}$NO$_3$ | | Ni(OH)$_2$ |
|---|---|---|---|
| Cycle No. | vs.Cd/Cd(OH)$_2$ mAh/g | vs.Fe/Fe(OH)$_2$ mAh/g | vs.Fe/Fe(OH)$_2$ mAh/g |
| 1 | | | 129 |
| 2 | | | 199 |
| 3 | | | 95 |
| 4 | | | 59 |
| 5 | 201(283) | 197(278) | 35 |
| 6 | | | 11 |
| 7 | | | 8 |
| . | | | |
| . | | | |
| . | | | |
| 30 | 156(221) | 157(222) | | the current yields shown in Table II for the Ni$_4$Fe(OH)$_{10}$NO$_3$ double hydroxide are the average values taken from two parallel test series. The numerical values shown in parentheses are current yields that result by extrapolating the actual current yields to an iron free hydroxide, i.e., by multiplying the actual current yields by the reciprocal of the wt. % Ni(OH)$_2$ as shown in Table I for the 80/20 sample. In making this extrapolation, the actual current yields correspond to an analytically determined Ni(OH)$_2$ content of only 70.9 wt. % in the double hydroxide (comp. Table I) and 100% wt.% Ni(OH)$_2$ for an iron free hydroxide. The fact that the calculated values approach the theoretical Faraday yield of 289 mAh/g for the transition Ni(OH)$_2 \rightarrow$ Ni-O-OH, at least in the early phase of the test cycle, suggests that the nickel is charged over three valent steps in the presence of iron that itself does not take part in the redox process.

As can be seen from Table II, for a "siderophile" nickel electrode in accordance with the present invention, the choice of the counter-electrode, Cd/Cd(OH)$_2$ or Fe/Fe(OH)2 makes little difference at least until the thirtieth cycle. In both cases, a steady and, in the case of the present cylindrical electrode geometry which is far from ideal, predictable decrease in capacity is measured.

The change in capacity of the comparison electrode comprising pure $\beta$-Ni(OH)$_2$ together with the Fe/Fe(OH)$_2$ counter-electrode, stands in noticeable contrast to the measurements taken for an electrode in accordance with the present invention. After reaching a peak during the second cycle, the capacity decreases markedly until there is a total capacity loss after only the seventh cycle.

In practice, a significant percentage of the two valent nickel metal is, when charged, oxidized to the four valent state when three valent iron is inserted into the host structure of the Ni(OH)$_2$ or Co(OH)$_2$ of the double hydroxide of the present invention. As a result, for a storage battery in accordance with the present invention, the loss of energy density that arises from the integration of iron into the host structure, since it does not contribute to the supply of current, is balanced by the increase in the specific capacity of the two valent metal hydroxide.

The charging process at the anode for the Ni/Fe double hydroxide, may be summarized by the following equations:

Charge to Ni$^{3+}$:

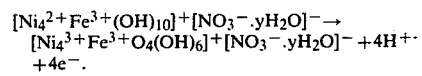

Charge to Ni$^{4+}$:

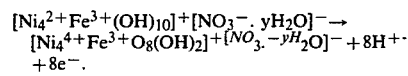

During this charging process, as shown by the above equations, protons dissociate from the double hydroxide as the nickel undergoes oxidation to a higher valent state. This results in an increase in acidity of the main layers and the incorporation of hydrated K$^+$ or Li$^+$ ions from the alkaline electrolyte into the main layers. Because of the presence of Fe$^{3+}$ ions in the main layers, however, the two protons formally belonging to each Fe$^{3+}$ do not dissociate, even with the total oxidation of Ni$^{2+}$ to Ni$^{4+}$. A certain residual amount of protons is necessary when diffusion of other protons take place, and the residual protons can contribute to the charge balance of the main layers that, from the exterior, are negatively polarized. This favors the electro-chemical oxidation of the nickel ions to Ni$^{4+}$, and results in a much higher charge capacity in comparison to pure nickel hydroxide electrodes.

The discovery that an electrode in accordance with the present invention discharges at a potential that is about 60 mV higher than that of pure nickel hydroxide electrodes, also indicates that four valent nickel is being produced. In addition, a sharp change from the potential of the actual charge phase to the potential for oxygen production could be detected during the course of charging.

A primary advantage of the "siderophile" storage battery described herein is in its surprising insensitivity to iron impurities. This is especially important since in many practical applications, the use of Cd/Cd(OH)$_2$ electrodes has dropped in favor of iron electrodes which are friendlier to the environment.

The "siderophile" nickel electrode of the present invention can be used with special advantage in a nickel/zinc secondary cell for which a special separator is described in German patent document DE-PS 31 17 660. The iron aquoxide particles that are spread over this surface separator are reduced to electrocatalytically active, separate iron particles upon coming in contact with zinc. This initiates spontaneous evolution of hydrogen which thus interrupts the growth of dendrites associated with zinc electrodes. This advantage, arising from the incorporation of iron impurities into the cell, does not occur in the case of conventional iron sensitive nickel electrodes.

In summary, a storage battery in accordance with the present invention has the following advantages:

A characteristic potential drop occurs between the charge phase and oxygen evolution. This potential drop makes it possible to prevent unnecessary H$_2$O decomposition.

The electrode has a steep discharge characteristic.

The charge capacity for electrodes made in accordance with the present invention is higher than that of prior art positive electrodes made from M(OH)$_2$ (M=Ni,Co).

Electrodes in accordance with the present invention can be formed into button cells and pocket electrodes without redesigning the structure of such cells.

The siderophile behavior of the storage battery of the present invention eliminates the need for membrane separators, and allows a high current density that is relatively free of loss of time during charging and discharging.

The replacement of nickel by iron in the positive electrode of the present invention does not result in a decrease in charge capacity compared to commercial nickel electrodes. Except for the active materials, a further saving of nickel by iron in the structural framework is possible.

The total energy efficiency is more favorable in the case of siderophile nickel electrodes than in the case of pure nickel hydroxide electrodes since the charge potential is lower and the discharge potential is higher.

While the invention has been described by reference to specific embodiments, this was for purposes of illustration only and should not be construed to limit the spirit or the scope of the invention.

We claim:

1. A positive electrode for secondary cells having alkaline electrolytes, wherein the active material comprises a double hydroxide having the formula $$[M^{2+}{}_{(I-x)}Fe^{3+}{}_x(OH)_2]^{x+}[(x/n)X^{n-}\cdot yH_2O]^{x-}$$

wherein x is in the range $0.05 \leq x \leq 0.4$ wherein the $M^{2+}$ is an oxidizable and reducible cation, and wherein $X^{n-}$ is at least one anion.

2. The electrode of claim 1, wherein x=0.2.

3. The electrode of claim 1, wherein the double hydroxide has a pyroaurite-like double layer structure.

4. The electrode of claim 1 wherein $M^{2+}$ is selected from the group consisting of $Ni^{2+}$ and $Co^{2+}$.

5. The electrode of claim 1 wherein $X^{n-}$ is selected from the group consisting of $NO_3^-$, $SO_4^{2-}$, and $CO_3^{2-}$.

6. The electrode of claim 1 further comprising support means for supporting said active material in said secondary cell.

7. A positive electrode for secondary cells having alkaline electrolytes, wherein the active material comprises a double hydroxide having the formula $$[M^{2+}{}_{(I-x)}Fe^{3+}{}_x(OH)_2]^{x+}[(x/n)X^{n-}\cdot yH_2O]^{x-}$$

wherein x=0.2, wherein $M_2^+$ is selected from the group consisting of $Ni^{2+}$ and $CO^{2+}$, and wherein $X^{n-}$ is selected from the group consisting of $NO_3^-$, $SO_4^{2-}$, and $CO_3^{2-}$.

8. The electrode of claim 7 wherein the double hydroxide has a pyroaurite-like double layer structure.

9. The electrode of claim 7, wherein $M^{2+}$ is $Ni^{2+}$ and $X^{n-}$ is $NO_3^-$.

10. A positive electrode for secondary cells having alkaline electrolytes, wherein the active material comprises a double hydroxide having the formula $$[Ni_4Fe(OH)_{10}]^+[NO_3^-\cdot yH_2O]^-,$$

said double hydroxide having a pyroaurite-like double layer structure.

11. An alkaline storage battery comprising a positive electrode, a negative electrode, and an electrolyte, said positive electrode having an active material comprising a double hydroxide of the formula $$[M^{2+}{}_{(I-x)}Fe^{3+}{}_x(OH)_2]^{x+}[(x/n)X^{n-}\cdot yH_2O]^{x-}$$

wherein y is in the range of $0.05 \leq x \leq 0.4$, wherein $M^{2+}$ is selected from the group consisting of $Ni^{2+}$ and $Co^{2+}$, and wherein $X^{n-}$ is selected from the group consisting of $NO_3^-$, $SO_4^{2-}$, and $CO_3^{2-}$.

12. The alkaline storage battery of claim 11 wherein x=0.2, $M_2^+$ is $Ni^{2+}$, and $X^{n-}$ is $NO_3^-$.

13. The alkaline storage battery of claim 11 wherein the negative electrode comprises Fe/Fe(OH)$_2$.

14. The alkaline storage battery of claim 13 wherein the negative electrode comprises Cd/Cd(OH)$_2$.

15. The alkaline storage battery of claim 13 wherein the negative electrode comprises Zn/ZnO.

16. The alkaline storage battery of claim 13 wherein the electrolyte comprises KOH.

* * * * *